United States Patent [19]

Orr

[11] 4,150,477

[45] Apr. 24, 1979

[54] PRE-LOADING JOINT FLANGES

[75] Inventor: Willis P. Orr, Lafayette, La.

[73] Assignee: Exxon Production Research Company, Houston, Tex.

[21] Appl. No.: 835,111

[22] Filed: Sep. 21, 1977

[51] Int. Cl.[2] .............................................. B23P 19/00

[52] U.S. Cl. ................................ 29/526 R; 29/157 R; 29/238; 29/252; 285/18; 285/363

[58] Field of Search ...................... 29/157 R, 526, 238, 29/252; 285/18, 363, 368, 405, 412

[56] References Cited

U.S. PATENT DOCUMENTS

| | | | |
|---|---|---|---|
| 375,464 | 12/1887 | Thacher et al. | 29/238 X |
| 409,008 | 8/1899 | Breymann | 29/238 X |
| 1,311,128 | 7/1919 | Kilgorin | 29/272 X |
| 3,015,883 | 1/1962 | Brown | 29/271 |
| 3,661,408 | 5/1972 | Gibbons | 285/364 X |
| 3,900,732 | 8/1975 | Coslales | 29/271 X |

*Primary Examiner*—Leon Gilden
*Attorney, Agent, or Firm*—J. S. Schneider

[57] ABSTRACT

A method for use in connecting flanges of a tubular joint is disclosed. A uniform pressure is applied to the flanges of the joint up to a desired preselected, measurable compression after which the nuts and bolts used to secure the flanges together are made up hand-tight. The preselected compression applied to the flanges is then released.

11 Claims, 11 Drawing Figures

PRE-LOADING JOINT FLANGES

BACKGROUND OF THE INVENTION

The present invention concerns flanged tubular joints and, more particularly, pre-loading ring joint flanged connections prior to making up the nuts and bolts used to secure the flanges to each other.

Tubular joint flange connections are currently made up and the seal between the flanges of those connections effected by hammering up the nuts on the bolts which are inserted through bolt holes located on the circumferences of the flanges. The integrity of the completed connection is dependent upon the skill, experience and judgment of the individuals swinging the hammers. This procedure, which is standard, has a number of disadvantages. It is time comsuming, arduous and hazardous, particularly in the larger joint sizes, i.e. ten inches and larger. Further, there is no measurable control over the loading or compression of the ring seal positioned between the flanges. Non-uniform loading on flanges of joints through which fluids flow caused by excessive tension in some bolts may result in the development of leaks, particularly when such joints are used in rough service as, for example, when used in an oil/gas well blowout preventer stack.

SUMMARY OF THE INVENTION

In accordance with the method of the invention, the flanges of a tubular joint to be secured together by nuts and bolts are pre-loaded to a preselected measured uniform compression after which the nuts and bolts are made up hand-tight. The preselected compression on the flanges is then released. The apparatus for carrying out the method comprises compression means capable of applying such compression to the flanges of the joints.

DESCRIPTION OF THE PREFERRED EMBODIMENTS

Figure 1:
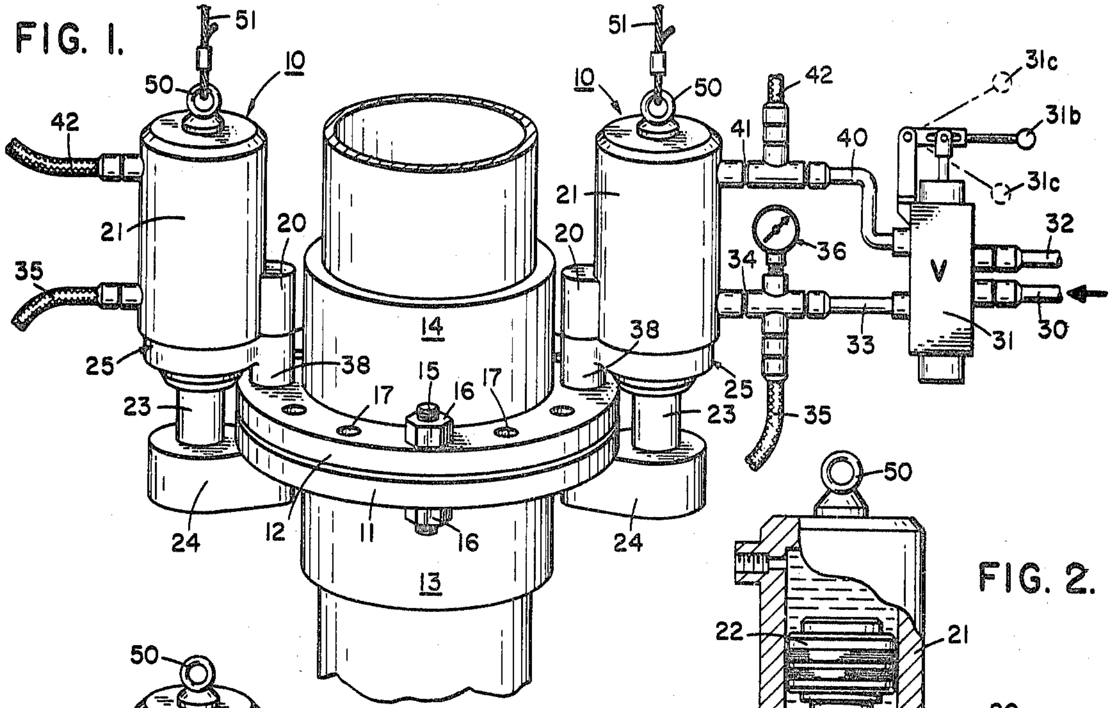
FIG. 1 illustrates a pre-loaded apparatus capable of carrying out the method of the invention.
Figure 2:
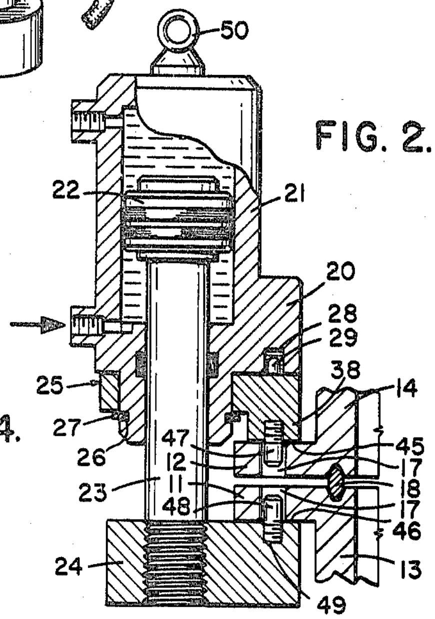
FIG. 2 is a partly sectional view of one of the compression units of FIG. 1 in greater detail.
Figure 3:
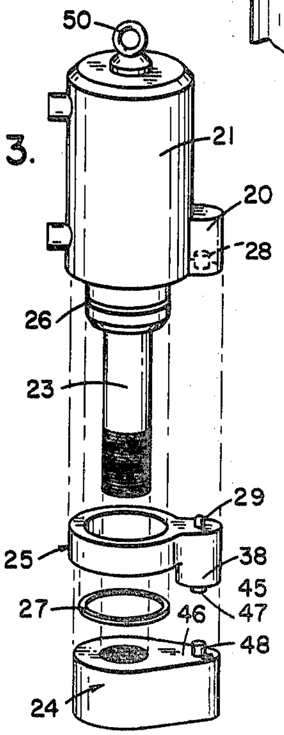
FIG. 3 is an exploded view of the compression unit of FIG. 2.
Figure 9:
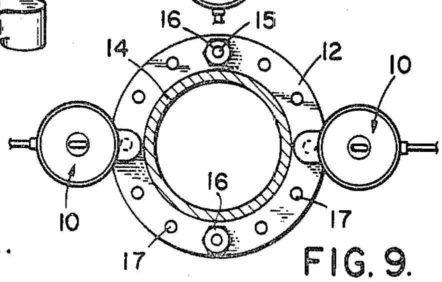

In FIGS. 1 and 9 there are shown two hydraulically operated clamp, compression or press units 10 mounted on ring joint flanges 11 and 12 of tubular members 13 and 14, respectively. A bolt 15 to which nuts 16 have been threaded extends through two of the bolt holes 17 of each of the flanges 11 and 12. In FIG. 2 a metal ring seal 18 is shown positioned between flanges 11 and 12. Referring also to FIG. 3, each clamp unit 10 includes a clamp actuating member or arm 20 formed on the lower end of a cylinder 21 in which a piston 22 reciprocates. A piston rod 23 is attached at its upper end to piston 22 and is threaded at its lower end to a movable clamp actuator member or arm 24.

Arm 20 may be used alone or with an extension member such as 25. Cylinder 21 is formed at its lower end with a circular groove 26 in which is fitted a split retainer ring 27 for retaining arm extension member 25 in position on cylinder 21. A threaded recess 28 is formed in the pad portion of arm 20. A retainer pin 29 formed on a projecting portion 38 of extension member 25 is positioned in recess 28. A conduit 30 connects a valve 31 to a hydraulic pressure source, not shown, and a conduit 32 connects valve 31 to a hydraulic reservoir, not shown. A conduit 33 connects valve 31 to a conduit 34 and a conduit or hose 35 through a pressure gauge connection 36. Conduit 34 connects into the lower end of cylinder 21 shown on the right-hand side of FIG. 1 and conduit 35 connects into the lower end of cylinder 21 shown on the left-hand side of FIG. 1. A conduit 40 connects valve 31 to conduits 41 and 42. Conduit 41 connects into the upper end of cylinder 21 shown on the right-hand side of FIG. 1 and conduit 42 connects into the upper end of cylinder 21 shown on the left-hand side of FIG. 1. Valve 31 is a three-way valve. In the position of the lever of valve 31, indicated at 31*a*, hydraulic fluid pressure from the source is applied to pistons 22 through conduit 30, valve 31 and conduits 33, 34 and 35. In that same position of the valve, fluid exhausts from cylinders 21 to the reservoir through conduits 41, 42, 40 and 32. In the position of the lever indicated at 31*b*, fluid pressure is held on pistons 22 in cylinders 21. In the position of the lever indicated at 31*c*, hydraulic fluid pressure from the source is applied to pistons 22 through conduits 32, 40, 41 and 42 and fluid exhausts from cylinders 21 to the reservoir through conduits 34, 35, 33 and 32.

Referring particularly to FIG. 2, the face or pad 45 of extension member 25 and the face or pad 46 of arm 24 engage the surfaces of flanges 12 and 11, respectively, at aligned bolt holes 17. To facilitate locating pads 45 and 46 on holes 17 a pin 47 is shown positioned on pad 45 and threaded into a recess formed in extension member 25. A similar pin 48 may be positioned on pad 46 and similarly threaded into a recess 49 formed in arm 24, as shown. Each compression unit 10 may be provided with a lift ring 50 to which a cable 51 may be attached to facilitate, if necessary, handling of the commpression unit.

Figure 4:
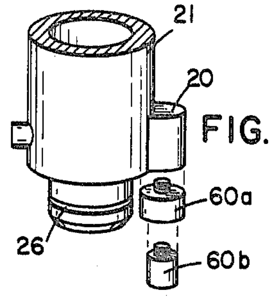
FIGS. 4–8A show various embodiments of adjustment components, extension members and pad adapters.
Figure 5:
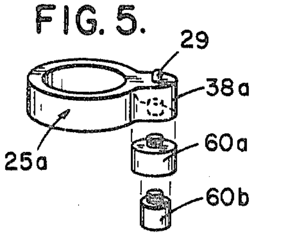
Figure 6:
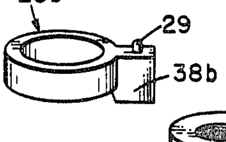
Figure 8:
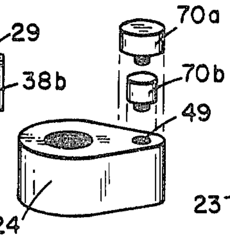
Figure 7:
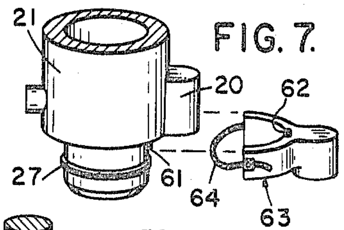
Figure 8A:
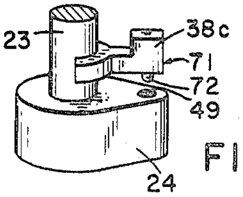

In FIGS. 4 through 8A variations in adjustment features for the clamp unit are illustrated. As shown in FIG. 4 a pad adapter, such as indicated at 60*a* or 60*b*, may be threaded into recess 28 in arm 20 of cylinder 21 to adjust the length of arm 20 (or extension member 25) vertically for different flange sizes. In FIG. 5 the projecting portion 38*a* of an extension member 25*a* is formed without the downwardly extending part of extension member 25. Pad adapters 60*a* or 60*b* may also be used with extension member 25*a* as indicated. In FIG. 6 another type of extension member 25*b*, which contains a narrower projecting portion 38*b*, is illustrated. In FIG. 7 cylinder 21 is provided with a key 61 which engages a key slot 62 formed on a half ring extension member 63 to which is attached a releasable elastic sling 64 for strapping extension member 63 to cylinder 21. In FIG. 8 lower arm 24 is illustrated together with a pad adapter 70*a* or 70*b* which may be threaded into recess 49 to adjust for variations in sizes of the flanges. In FIG. 8A still another type extension member 71 is illustrated. Extension member 71 has a narrow arm 24 projecting portion 38*c* and is positioned by inserting pin 72 into threaded recess 49.

Figure 10:
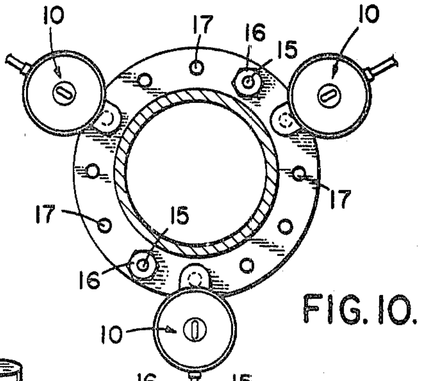
FIGS. 9 and 10 illustrate two and three compression units, respectively, arranged on the flanges of the joint.

In FIG. 9 two clamp units 10 are located at points 180° apart. In FIG. 10 three clamp units 10 are arranged at three points approximately 120° apart. Four clamp units arranged at four points 90° apart or even more clamp units spaced equally or approximately equally about the circumference of the flanges may be used. Clamp units are preferably, as mentioned above, attached to the flanges at the bolt holes. For many joints that type attachment permits adequate space for the pads of the clamp units to be attached to the flanges and indexed with respect thereto by means of the empty bolt holes as locators. However, the pads may be positioned between bolt holes where there is sufficient room for positioning them; or the clamping units may be constructed so as to bridge the bolt holes.

OPERATION

When it is desired to make up tubular members 13 and 14, bolt holes 17 and flanges 11 and 12 are aligned, as shown in FIG. 1, and pads 45 and 46 of extension member 25 and arm 24, respectively, of each clamp unit 10 are placed over bolt holes 17 which are spaced 180° apart. Hydraulic fluid from the source is then applied, with the valve lever in the 31*a* position, through conduit 30, valve 31, conduits 33, 34 and 35 to the lower end of cylinders 21. Pistons 22 move upward to cause arms 20 and 24 to press flanges 11 and 12 together. Any fluids in the upper ends of cylinders 21 are exhausted to the reservoir through conduits 41, 42, 40 and 32. Gauge 36 measures the hydraulic fluid pressure applied to pistons 22 and when a preselected desired pressure has been reached, the lever on valve 31 is moved to position 31*b* in which position the preselected pressure is held on the pistons. Then, bolts 15 are inserted through the open bolt holes 17 and nuts 16 are hand-tightened on the bolts. Valve 31 is then moved to position 31*c* in which position hydraulic fluid from the fluid pressure source flows through conduit 30, valve 31 and conduits 40, 41 and 42 into the upper ends of cylinders 21 to force pistons 22 downward and exhaust fluid through conduits 34, 35, 33 and 32 to the reservoir. Clamp units 10 are then removed and bolts 15 are inserted into the bolt holes on which the pads of clamp units 10 were attached and nuts 16 are hand-tightened on these bolts.

As an example of the magnitude of the forces involved in preloading flanges, a ten inch - five thousand pound working pressure flange must be pre-loaded in excess of 500,000 pounds compression. The compression unit has to be capable of applying in excess of one million pounds compression on larger flanges and higher pressure.

The method may also be employed when it is desired to disconnect tubular members 13 and 14. First the nuts on the bolts which were made up after the press units had been removed (or other symmetrically spaced apart nuts and bolts) are loosened by hammering and the nuts and bolts in those bolt holes removed. Then each clamp unit 10 would be attached to flanges 11 and 12 at those bolt holes and pressure applied to pistons 22 to substantially the same pressure as preselected pressure employed when making up the connection. While maintaining that compression on the flanges, the remaining nuts are loosened by hand. Thereafter, the pressure on pistons 22 is released and clamp units 10 removed.

It would not be necessary to use the bolt hole locations for the pads of arms 20 and 24 might be located between the bolt holes (in which case pins 47 and 48 would not be used unless additional locator holes were drilled in the flanges) where there is sufficient room for positioning those pads. So locating the pads would faciltate makeup and removal of the nuts from the bolts for the extra steps in bolting and unbolting the bolt holes occupied by clamp units 10 would be unnecessary.

Use of identical hydraulic press units and a common hydraulic source and symmetrical positioning of the press units ensures uniform loading on the flanges. The term hand-tight as used herein means making up a nut or nuts on a threaded bolt by hand or by a hand wrench.

Although the clamp unit is shown in figures and described as including extension members and/or pad adapters the clamp units may be used without such components. Also, although not illustrated, extension members may be used with lower arm 24.

Advantages of the method of the invention are: The ring joint seal is uniformly loaded; considerable time and physical effort in making and/or disconnecting joints is saved; for example, approximately one to two hours of drilling rig time is saved when nippling up blowout preventer stacks (and any leaks which are prevented by the method of this invention would result in drilling rig savings of an additional three to four hours normally required to renipple up after testing the joint); safety to personnel, particularly on large flanged connections used in oil and/or gas drilling operations such as flanged connections on blowout preventer stacks; some connections could be pressure tested for leaks prior to make up of all nuts and bolts; and it is possible to employ the method in small restricted spaces such as in the cellars of drilling rigs where hammering of the nuts would be difficult or impossible.

While hydraulic fluid pressure for operating the clamp units as described above is preferred, other type power for the clamp units may be employed instead so long as approximately the same pressure or force can be applied at each of the clamp units. Also, other type clamp units might be used instead of the one illustrated and described herein. For example, pivotal lever arms might be used as the clamp unit. Further, although described as a metal ring seal other types of seals may be used between flanges 11 and 12. In addition, the manner of applying the hydraulic pressure may be varied, e.g. a simple two-way valve may be used in place of the three-way valve shown. Other changes and modifications may be made in the embodiments of the invention described herein without departing from the spirit and scope of the invention.

I claim:

1. A method for use in connecting of disconnecting two ring joint flanges of a tubular joint, said flanges having aligned bolt holes comprising the steps of:

attaching clamp means to said flanges capable of applying substantially uniform pressure to said flanges up to a preselected, measured compression;

applying said pressure to said flanges through said clamp means;

making up nuts hand-tight on bolts inserted through said bolt holes; and thereafter removing said clamp means from said flanges.

2. A method as recited in claim 1 including the steps of:

hand-loosening said nuts from said bolts inserted through said bolt holes in said flanges which secure such flanges together and then removing said nuts from said bolts; and thereafter removing said clamp means from said flanges.

3. A method as recited in claim 1 in which at least two clamp means are used.

4. A method as recited in claim 3 in which said clamp means are hydraulically operated.

5. A method as recited in claim 1, including the steps of:

attaching said clamp means to said flanges; applying said pressure to said flanges through said clamp means;

hand-loosening said nuts from said bolts; and removing said clamp means from said flanges.

6. A method for use in connecting two ring joint flanges of a tubular joint, said flanges having aligned bolt holes comprising the steps of:

attaching clamp means to said flanges capable of applying substantially uniform pressure to said flanges up to a preselected measured compression;

applying said compression to said flanges; and making up nuts on bolts inserted through said bolt holes hand tight.

7. A method as recited in claim 6 including releasing said compression applied to said flanges.

8. A method as recited in claim 7 in which at least two clamp means are employed.

9. A method as recited in claim 8 in which said clamp means are hydraulically operated.

10. A method as recited in claim 9 in which said clamp means are positioned on bolt holes in said flanges.

11. A method as recited in claim 10 in which said pressure is applied at symmetrical points on said flanges.

* * * * *